US011303855B2

(12) United States Patent
Iijima

(10) Patent No.: US 11,303,855 B2
(45) Date of Patent: Apr. 12, 2022

(54) DISPLAY CONTROL METHOD, INFORMATION PROCESSING SERVER, AND DISPLAY TERMINAL

(71) Applicant: Panasonic Intellectual Property Corporation of America, Torrance, CA (US)

(72) Inventor: Takahiro Iijima, Saratoga, CA (US)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 112 days.

(21) Appl. No.: 16/905,263

(22) Filed: Jun. 18, 2020

(65) Prior Publication Data
US 2020/0322579 A1 Oct. 8, 2020

Related U.S. Application Data

(63) Continuation of application No. PCT/JP2018/047763, filed on Dec. 26, 2018.

(60) Provisional application No. 62/611,109, filed on Dec. 28, 2017.

(30) Foreign Application Priority Data

Oct. 24, 2018 (JP) .............................. JP2018-200429

(51) Int. Cl.
*H04N 7/18* (2006.01)
*G07C 9/00* (2020.01)
*H04L 12/28* (2006.01)

(52) U.S. Cl.
CPC ......... *H04N 7/186* (2013.01); *G07C 9/00571* (2013.01); *G07C 9/00904* (2013.01); *H04L 12/282* (2013.01); *H04L 2012/285* (2013.01)

(58) Field of Classification Search
CPC ............... H04N 7/186; G07C 9/00571; G07C 9/00904; H04L 12/282; H04L 2012/285; H04M 9/02
See application file for complete search history.

(56) References Cited

U.S. PATENT DOCUMENTS

2017/0041572 A1 2/2017 Kasedou et al.

FOREIGN PATENT DOCUMENTS

| JP | 2008-252615 | 10/2008 |
|----|-------------|---------|
| JP | 4892386 | 3/2012 |
| JP | 2017-220795 | 12/2017 |

OTHER PUBLICATIONS

International Search Report (ISR) dated Feb. 5, 2019 in International (PCT) Application No. PCT/JP2018/047763.

*Primary Examiner* — Jared Walker
(74) *Attorney, Agent, or Firm* — Wenderoth, Lind & Ponack, L.L.P.

(57) ABSTRACT

A display control method performed using a system including an information processing server includes: (a) obtaining, using a sensor, a user state indicating whether a user is currently cooking using a cooker, when an image of a delivery person delivering an item to a building in which the user is present is captured by a camera provided at an entrance door of the building; (b) obtaining content information of the item; (c) obtaining at least one suggestion associated with the user state and the content information of the item; and (d) causing a display terminal provided in the building to display the image of the delivery person, the content information of the item, and the at least one suggestion. Here, (a) to (d) are performed by the information processing server.

17 Claims, 13 Drawing Sheets

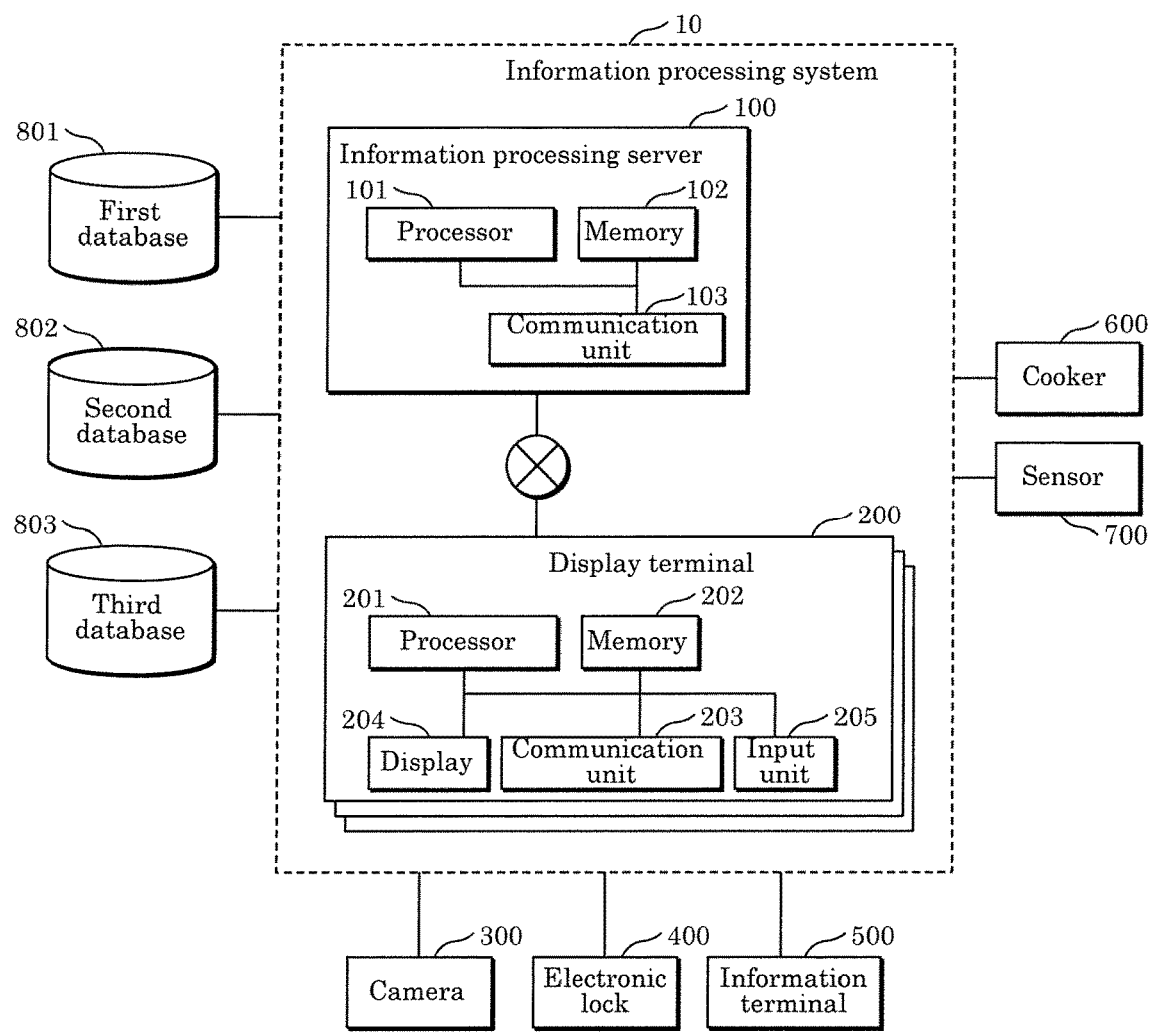

FIG. 4

| ID | Scheduled Delivery Date and Time | Image Information | Urgent Flag |
|---|---|---|---|
| 000001 | 2018/10/30 12 : 00 | .../image01.jpg | 1 |
| 000002 | 2018/10/30 16 : 00 | .../image02.jpg | 0 |
| ... | ... | ... | ... |

| User State | Urgent Flag | First Suggestion | Second Suggestion |
|---|---|---|---|
| Currently Cooking | 1 | Cooker OFF | Unlock |
| Currently Cooking | 0 | Receive Later | Receive Now |
| Not Cooking | 1 | Unlock | — |
| Not Cooking | 0 | Receive Now | Receive Later |

803a

DISPLAY CONTROL METHOD, INFORMATION PROCESSING SERVER, AND DISPLAY TERMINAL

CROSS REFERENCE TO RELATED APPLICATIONS

This application is a U.S. continuation application of PCT International Patent Application Number PCT/JP2018/047763 filed on Dec. 26, 2018, claiming the benefit of priority of U.S. Provisional Patent Application No. 62/611,109 filed on Dec. 28, 2017 and priority of Japanese Patent Application Number 2018-200429 filed on Oct. 24, 2018, the entire contents of which are hereby incorporated by reference.

BACKGROUND

1. Technical Field

The present disclosure relates to a display control method, an information processing server, and a display terminal for controlling display of a suggestion regarding reception of an item from a delivery person who delivers the item to a building in which a user is present.

2. Description of the Related Art

There is a conventional technique of displaying an image captured by a camera provided at the entrance door of a building, on a display terminal in the building. For example, Japanese Unexamined Patent Application Publication No. 2017-220795 discloses a video door phone device for stable wireless communication between an indoor master unit and an entrance slave unit. With such a video door phone device, when, for example, a delivery person arrives at the door of a building and activates an intercom, an image of the delivery person captured by the entrance slave unit is displayed on the display of the indoor master unit.

SUMMARY

A display control method according to an aspect of the present disclosure is a display control method performed using a system including an information processing server, and the display control method includes: (a) obtaining, by the information processing server, using a sensor, a user state indicating whether a user is currently cooking using a cooker, when an image of a delivery person delivering an item to a building in which the user is present is captured by a camera provided at an entrance door of the building; (b) obtaining, by the information processing server, content information of the item; (c) obtaining, by the information processing server, at least one suggestion associated with the user state and the content information of the item; and (d) causing, by the information processing server, a display terminal provided in the building to display the image of the delivery person, the content information of the item, and the at least one suggestion.

Note that these general or specific aspects may be implemented using a system, a device, an integrated circuit, a computer program, or a computer-readable recording medium such as a CD-ROM, or any combination of systems, devices, integrated circuits, computer programs, or recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 is a block diagram illustrating a functional configuration of the information processing system according to Embodiment 1;

FIG. 3 illustrates an example of first data according to Embodiment 1;

FIG. 4 illustrates an example of second data according to Embodiment 1;

FIG. 5 illustrates an example of third data according to Embodiment 1;

DETAILED DESCRIPTION OF THE EMBODIMENTS

Hereinafter, embodiments will be described in detail with reference to the accompanied drawings.

Note that the following embodiments each illustrate a general or specific example. The numerical values, shapes, materials, constituent elements, the arrangement and connection of the constituent elements, steps, the processing order of the steps, etc. illustrated in the following exemplary embodiments are mere examples, and are therefore not intended to limit the scope of the claims. Among the constituent elements in the following embodiments, those not recited in any one of the independent claims representing the most generic concepts will be described as optional constituent elements. Note that the drawings are represented schematically and are not necessarily precise illustrations. Throughout the drawings, constituent elements that are essentially the same share like reference signs, and overlapping descriptions thereof are omitted or simplified.

The following describes the knowledge forming the basis of an information processing system and method according to the present disclosure. The inventor has considered the actions that a user would take when a delivery person comes. When a delivery person comes, the user takes different actions depending on the user's situation. Meanwhile, the user is required to take a prompt action in response to the delivery person. In view of this, an information processing system and method according to the present disclosure provide the user with information about the delivery to make it easier for the user to determine the action that the user wants to take. Additionally, an information processing system and method according to the present disclosure simplify the user's action by providing the user with a suggestion to expedite the user's action, and controlling devices according to the user's response to the suggestion displayed. That is to say, the inventor has conceived an information processing system and method which display, on one screen, both information about the delivery and a suggestion for expediting the user's action, to facilitate both the user's understanding of the situation and the user's action.

Embodiment 1

[Configurations of Information Processing System and Peripheral Devices]

Figure 1:
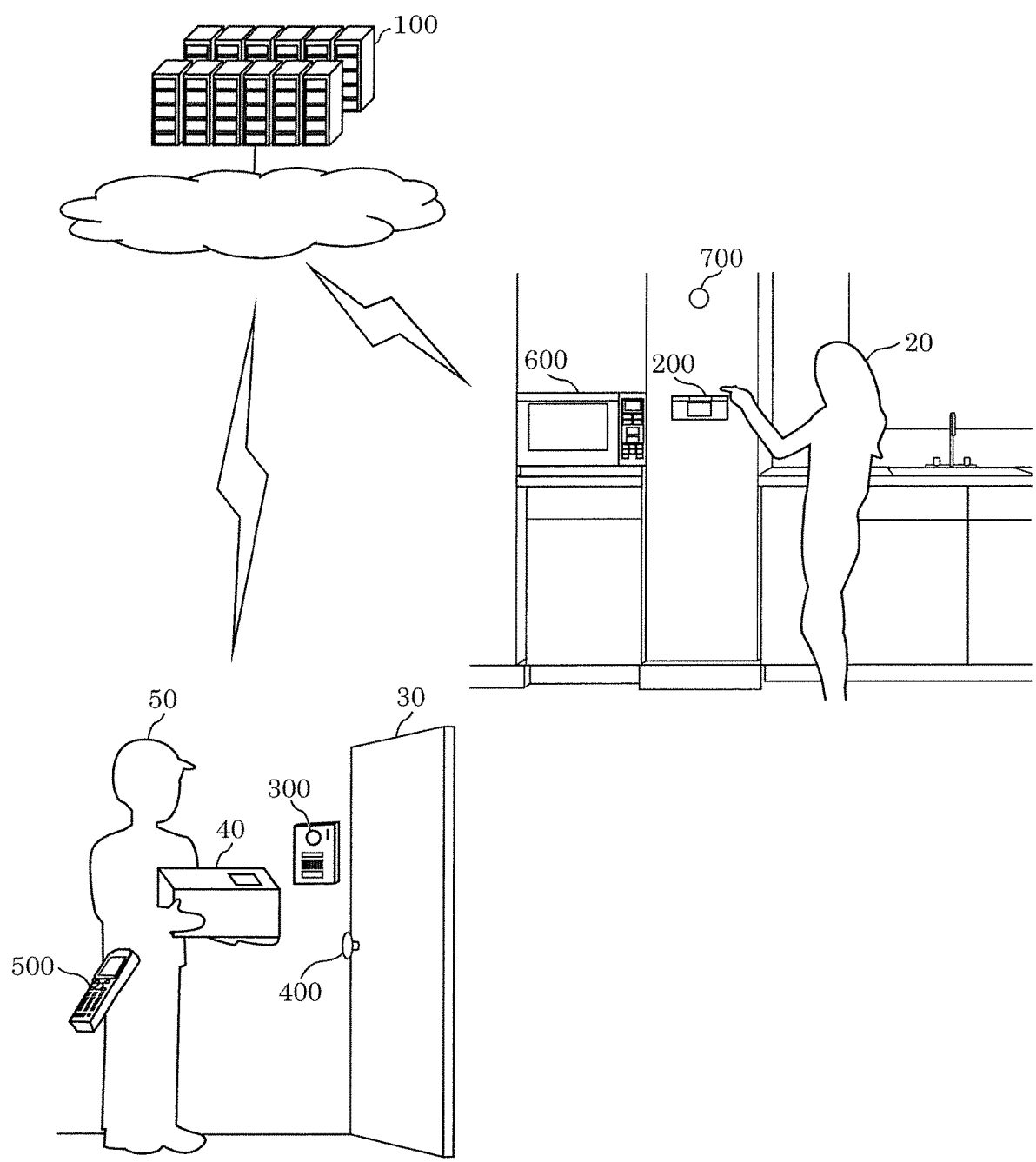
FIG. 1 is an external view of an information processing system and peripheral devices according to Embodiment 1.

First, configurations of an information processing system and peripheral devices according to Embodiment 1 will be described with reference to FIG. 1 to FIG. 5. FIG. 1 is an external view of an information processing system and peripheral devices according to Embodiment 1. FIG. 2 is a block diagram illustrating a functional configuration of the information processing system according to Embodiment 1.

Information processing system 10 includes information processing server 100 and one or more display terminals including display terminal 200. Information processing server 100 and one or more display terminals are communicably connected to one another. Hereinafter, display terminal 200 will be described as a representative of the one or more display terminals, and description of the rest of the display terminals will be omitted.

Information processing system 10 is communicably connected to camera 300, electronic lock 400, information terminal 500, cooker 600, sensor 700, first database 801, second database 802, and third database 803.

Information processing server 100 is, for example, a cloud server, and causes display terminal 200 to display at least one suggestion based on a user state.

Display terminal 200 includes a display, and displays, on the display, at least one suggestion received from information processing server 100. In the present embodiment, display terminal 200 is provided on a wall surface in a building. Alternatively, display terminal 200 may be a mobile terminal.

Camera 300 is provided at entrance door 30 of the building. In FIG. 1, camera 300 is built into a door phone. For example, camera 300 captures an image of delivery person 50 who delivers item 40 to the building in which user 20 is present. The building includes, for example, a residence, an apartment building, an office building having a plurality of offices, a commercial building having a plurality of shops, and a hotel having a plurality of rooms. Entrance door 30 of an apartment building may be an entrance door of each residence, or may be an entrance door of the apartment building. Entrance door 30 of an office building may be an entrance door of each office, or may be an entrance door of the office building. Likewise, entrance door 30 of a commercial building may be an entrance door of each shop, or may be an entrance door of the commercial building.

Electronic lock 400 is a lock capable of remote control on the opening and closing of entrance door 30 of the building. Electronic lock 400 is also referred to as an electronic key. Electronic lock 400 controls the opening and closing of entrance door 30 based on a lock/unlock signal from information processing system 10.

Information terminal 500 is a terminal usable by delivery person 50. Information terminal 500 is a handy terminal carried by delivery person 50, for example. Information terminal 500, for example, receives a request for redelivery of item 40 from information processing system 10. Information terminal 500 may be provided at entrance door 30, for example.

Cooker 600 is a device used when user 20 cooks. Cooker 600 is, for example, a microwave oven, a cooking stove, or the like. Cooker 600 can control power ON and OFF based on a signal from information processing system 10.

Sensor 700 transmits to information processing system 10 a sensor value used for obtaining a user state indicating whether user 20 is currently cooking using cooker 600. Specifically, sensor 700 is, for example, an image sensor which is provided in the building and captures an image of the inside of the building. Sensor 700 may be, for example, an ON/OFF sensor which detects power ON and OFF of cooker 600.

First database 801 is a storage device storing first data 801a which associates sensor values and user states for each of a plurality of users. Specifically, first database 801 is, for example, a database server which includes a processor, memory, and a hard disk drive.

Here, first data 801a will be described using a specific example. FIG. 3 illustrates an example of first data 801a according to Embodiment 1.

In FIG. 3, first data 801a includes user information, sensor value, and user state. User information is information that identifies users. Sensor value represents an image pattern, for example. User state indicates whether a user is currently cooking. According to first data 801a in FIG. 3, the user state is determined to be cooking when Pattern 1 is included in an image of the user identified as USER 1.

Second database 802 is a storage device storing second data 802a which associates (i) a plurality of pieces of identification information or a plurality of scheduled delivery dates and times and (ii) pieces of content information of a plurality of items. Specifically, second database 802 is, for example, a database server which includes a processor, memory, and a hard disk drive.

Here, second data 802a will be described using a specific example. FIG. 4 illustrates an example of second data 802a according to Embodiment 1.

In FIG. 4, second data 802a includes ID, scheduled delivery date and time, image information, and urgent flag. ID is an example of identification information for identifying content information. Scheduled delivery date and time indicates a date and time of scheduled delivery of an item. Image information is identifier information which identifies an image of an item (for example, a uniform resource identifier (URI)). Urgent flag is an example of urgent information indicating whether the delivery of the item is urgent. For example, the urgent flag is set by the user when the user purchases an item via a website. Here, urgent flag 1 indicates that the delivery is urgent, whereas urgent flag 0 indicates that the delivery is non-urgent. The image information and the urgent flag correspond to the content information of the item.

It can be seen from second data 802a in FIG. 4 that, for example, the image of an item identified by 000001 is . . . /image01.jpg, and that the delivery of this item is urgent. It can also be seen that the image of an item scheduled to be delivered on 2018/10/30 at 12:00 is . . . /image01.jpg, and that the delivery of this item is urgent.

Third database 803 is a storage device storing third data 803a which associates (i) a plurality of combinations of a user state and content information of an item and (ii) a plurality of suggestion sets each including at least one suggestion. Specifically, third database 803 is, for example, a database server which includes a processor, memory, and a hard disk drive.

Here, third data 803a will be described using a specific example. FIG. 5 illustrates an example of third data 803a according to Embodiment 1.

Third data 803a in FIG. 5 includes user state, urgent flag, first suggestion, and second suggestion. User state indicates whether the user is currently cooking. As in FIG. 4, urgent flag is an example of urgent information indicating whether the delivery of the item is urgent. According to third data 803a in FIG. 5, when, for example, the user state is Cooking and the urgent information indicates Yes, the first suggestion of Cooker OFF and the second suggestion of Unlock are obtained.

[Configuration of Information Processing Server]

Next, a configuration of information processing server 100 will be described. As illustrated in FIG. 2, information processing server 100 includes processor 101, memory 102, and communication unit 103.

Processor 101 is an electric circuit connected to memory 102. When an image of delivery person 50 delivering item 40 to the building in which user 20 is present is captured by camera 300 provided at entrance door 30 of the building, processor 101 obtains, using sensor 700, a user state indicating whether user 20 is currently cooking using cooker 600. Processor 101 further obtains content information of item 40. Processor 101 then obtains at least one suggestion associated with the user state, and causes display terminal 200 to display the image of delivery person 50, the content information of item 40, and at least one suggestion. The details of the processing will be described later using a flow chart etc.

Memory 102 is, for example, a semiconductor memory and/or a hard disk drive. Memory 102 can store a software program or an instruction.

When the software program or the instruction stored in memory 102 is executed, processor 101 can perform the processing described above.

Communication unit 103 is a network adapter for performing one or both of wired communication and wireless communication with display terminal 200, camera 300, electronic lock 400, information terminal 500, cooker 600, sensor 700, first database 801, second database 802, and third database 803 via a communication network. The communication network may be, for example, the Internet, a wide area network (WAN), a local area network (LAN), or any combination of these. Wireless communication may use wireless LAN, Bluetooth (registered trademark), ZigBee (registered trademark), or any combination of these.

[Configuration of Display Terminal]

Next, a configuration of display terminal 200 will be described. As illustrated in FIG. 2, display terminal 200 includes processor 201, memory 202, communication unit 203, display 204, and input unit 205.

Processor 201 is an electric circuit connected to memory 202. Processor 201 displays, on display 204, an image of delivery person 50, content information of item 40, and at least one suggestion which are received from information processing server 100.

Memory 202 is, for example, a semiconductor memory and/or a hard disk drive. Memory 202 can store a software program or an instruction. When the software program or the instruction stored in memory 202 is executed, processor 201 performs various processing.

Communication unit 203 is a network adapter for performing one or both of wired communication and wireless communication with information processing server 100 via a communication network.

Display 204 displays the image of delivery person 50, the content information of item 40, and at least one suggestion which are received from information processing server 100. For example, display 204 is a liquid crystal display or an organic EL display.

Input unit 205 is an input device used for receiving user input. For example, input unit 205 is a touch panel (that is, a touch screen) provided integrally with display 204. Input unit 205 may be, for example, a mechanical button, a mouse, a keyboard, or any combination of these and a touch panel.

[Operation of Information Processing System]

Figure 6:
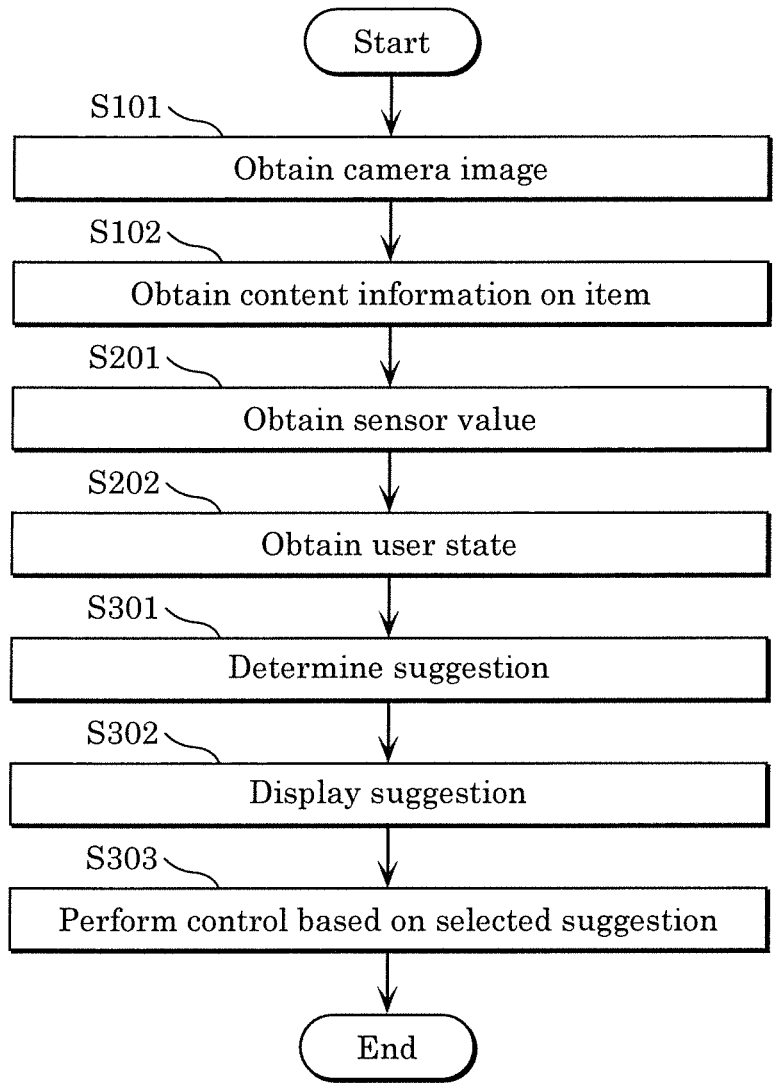
FIG. 6 is a flow chart illustrating processing of the information processing system according to Embodiment 1.

Next, processing of information processing system 10 configured as described above will be described with reference to FIG. 6 to FIG. 12. FIG. 6 is a flow chart illustrating processing of the information processing system according to Embodiment 1.

[Step S101]

Figure 7:
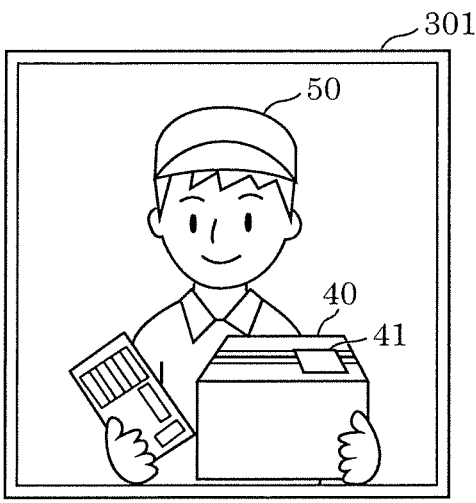
FIG. 7 illustrates an example of a camera image according to Embodiment 1.

Processor 101 of information processing server 100 obtains an image of delivery person 50 from camera 300 (hereinafter also referred to as a camera image). FIG. 7 is an example of camera image 301 according to Embodiment 1. In FIG. 7, camera image 301 includes delivery person 50 and item 40. Camera image 301 also includes sheet 41 on which identification information identifying content information of item 40 is provided. For example, the identification information is provided on sheet 41 in the form of a bar code and/or a character string.

[Step S102]

Processor 101 of information processing server 100 obtains the content information of item 40. Specifically, processor 101 first obtains the identification information from camera image 301. Then, processor 101 obtains the content information of item 40 based on the obtained identification information, by referring to second data 802a. For example, processor 101 obtains 000001 as the identification information by reading the bar code provided on sheet 41 of camera image 301. Then, by referring to second data 802a in FIG. 4, processor 101 obtains, as the content information of item 40, image information . . . /image01.jpg and urgent flag 1 which are associated with 000001.

Note that processor 101 does not necessarily need to obtain the content information of item 40 based on the identification information. For example, processor 101 may obtain the content information of item 40 based on the date and time of obtainment of the image, by referring to second data 802a. For example, when camera image 301 was captured at 11:55 on Oct. 30, 2018, processor 101 may obtain, as the content information of item 40, image information . . . /image01.jpg and urgent flag 1 which are associated with the scheduled delivery date and time 2018/10/30 12:00 which is closest to the actual capturing date and time.

[Step S201]

Processor 101 of information processing server 100 obtains a sensor value that is an output value of sensor 700. When sensor 700 is an image sensor, for example, processor 101 obtains image data as the sensor value. When sensor 700 is an ON/OFF sensor, for example, processor 101 obtains an ON/OFF signal as the sensor value.

[Step S202]

Processor 101 of information processing server 100 obtains a user state using sensor 700. Specifically, processor 101 obtains a user state based on a sensor value obtained by sensor 700, for example. More specifically, processor 101 obtains a user state based on a sensor value by referring to first data 801a. At this time, processor 101 may identify the user based on the sensor value, and obtain a user state based on the identified user and the sensor value by referring to first data 801a.

For example, when sensor 700 is an image sensor, processor 101 recognizes the user based on image data. The method for user recognition is not particularly limited, and a conventional technique may be used. For example, processor 101 identifies user 20 as USER 1. Here, when the image data includes Pattern 1, processor 101 obtains, by referring to first data 801a in FIG. 3, a user state indicating that user 20 is currently cooking using cooker 600.

When, for example, sensor 700 is an ON/OFF sensor and processor 101 obtains an ON signal, processor 101 obtains a user state indicating that user 20 is currently cooking using cooker 600. On the other hand, when processor 101 obtains an OFF signal, processor 101 obtains a user state indicating that user 20 is not cooking using cooker 600.

[Step S301]

Processor 101 of information processing server 100 determines at least one suggestion. Specifically, processor 101 obtains at least one suggestion associated with the user state and the content information of item 40. For example, processor 101 obtains, by referring to third data 803a, at least one suggestion associated with the obtained user state and content information of item 40.

For example, when the user state indicates that the user is currently cooking, and the urgent information included in the content information of item 40 indicates that the delivery is urgent, processor 101 obtains, by referring to third data 803a in FIG. 5, a first suggestion to turn off cooker 600 and a second suggestion to unlock electronic lock 400 on entrance door 30 of the building. For example, when the user state indicates that the user is currently cooking, and the urgent information indicates that the delivery is non-urgent, processor 101 obtains, by referring to third data 803a in FIG. 5, a first suggestion to request redelivery of item 40 and a second suggestion to receive item 40. For example, when the user state indicates that the user is not cooking, and the urgent information indicates that the delivery is urgent, processor 101 obtains, by referring to third data 803a in FIG. 5, a first suggestion to unlock electronic lock 400 on entrance door 30 of the building. In other words, in this case, processor 101 obtains a single suggestion. For example, when the user state indicates that the user is not cooking, and the urgent information indicates that the delivery is urgent, processor 101 obtains, by referring to third data 803a in FIG. 5, a first suggestion to receive item 40 and a second suggestion to request redelivery of item 40.

[Step S302]

Processor 101 of information processing server 100 causes display terminal 200 to display at least one suggestion determined. For example, processor 101 transmits screen data including at least one suggestion to display terminal 200. Here, specific examples of a screen displayed by display terminal 200 will be described with reference to FIG. 8 to FIG. 12.

Figure 8:
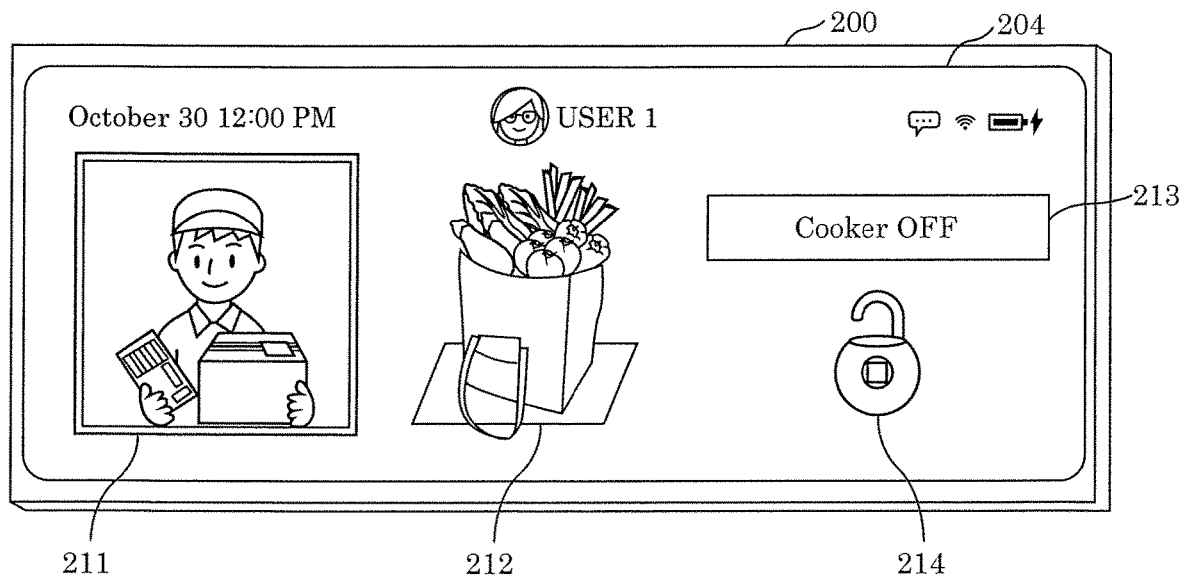
FIG. 8 illustrates an example of a first screen according to Embodiment 1.

FIG. 8 illustrates an example of a first screen according to Embodiment 1. The first screen is displayed when the user state indicates that the user is currently cooking and the urgent information indicates that the delivery is urgent.

As illustrated in FIG. 8, display 204 displays, in sequence from the left to the right, camera image 211, image 212 of item 40, first suggestion 213 to turn off cooker 600, and second suggestion 214 to unlock electronic lock 400 on entrance door 30. Here, when an operation to select first suggestion 213 and/or second suggestion 214 is performed, device control corresponding to the selected suggestion is performed. That is to say, the screen of display 204 is segmented. The screen includes a region for displaying a camera image, a region for displaying the content of an item, and a region for displaying at least one suggestion. Display 204 also displays, at the top, a current date and time, a login user, and various states. The display of such information is a mere example, and is not limited to this example.

Camera image 211, image 212 of item 40, and first and second suggestions 213 and 214 are respectively displayed in three display regions arranged horizontally on display 204. Here, the three display regions are identical in shape and size. Each of the three display regions is a square region occupying about one third of the display area of display 204. Note that being identical encompasses being substantially identical as well as being strictly identical. In other words, being identical means being approximately identical. Furthermore, a square encompasses a precise square and shapes which can be considered substantially identical to a precise square. For example, the screen may include three display regions only. In a more limited example, the screen of display 200 may only include three display regions that are identical in size and shape.

First suggestion 213 and second suggestion 214 are arranged next to each other vertically. Here, first suggestion 213 is displayed with higher priority by being displayed above second suggestion 214. Note that the method for display with priority is not limited to the vertical arrangement. For example, first suggestion 213 may be displayed with higher priority by being displayed in a different size or color.

Camera image 211, image 212 of item 40, and first and second suggestions 213 and 214 may be displayed on display 204 simultaneously, for example. In other words, the three pieces of information may simultaneously start being displayed. Alternatively, for example, after camera image 211 is displayed, image 212 of item 40 and first and second suggestions 213 and 214 may be displayed with camera image 211. This way, image 212 of item 40 and first and second suggestions 213 and 214 are displayed after the user recognizes camera image 211, thus assisting the user to grasp the current situation in sequence. For example, when the user sees camera image 211 and recognizes that a delivery item has arrived, the user considers what to do next. By displaying image 212 of item 40 and first and second suggestions 213 and 214 at this timing, it is possible to provide the user with information appropriate to the user's situation. For example, since the user in, for example, a residence or an apartment building uses the system on a daily basis and becomes familiar with the information displayed on display 204, camera image 211, image 212 of item 40, and first and second suggestions 213 and 214 may be displayed simultaneously if the user has used the system for a certain period or longer. Examples of the certain period include one week, one month, and three months. In the case of an office building, a commercial building, or a hotel, for example, the user may not use the system on a daily basis, and thus may be unfamiliar with the information displayed on display 204. In the case of an office building, a commercial building, or a hotel, for example, camera image 211 may be displayed first, and image 212 of item 40 and first and second suggestions 213 and 214 may be displayed next, so that even the unfamiliar user can easily understand the information. Note that although the example above is the case of displaying image 212 of item 40 and first and second suggestions 213 and 214 simultaneously, camera image 211, image 212 of item 40, and first and second suggestions 213 and 214 may be separately displayed sequentially.

The following describes the meaning of camera image 211, image 212 of item 40, and first and second suggestions 213 and 214 included in the first screen. Camera image 211 is included to allow user 20 to recognize arrival of delivery person 50, when delivery person 50 arrives at entrance door 30 of the building. Image 212 of item 40 is included to show the content of item 40 delivered by delivery person 50. This allows user 20 to recognize item 40 that is being delivered by delivery person 50.

The first screen includes first suggestion 213 and second suggestion 214 to provide guidance on the next action of user 20 in response to camera image 211 and image 212 of item 40. Because user 20 is highly likely to receive item 40, first suggestion 213 and second suggestion 214 are displayed as the next action of user 20 determined based on image 212 of item 40. That is to say, first suggestion 213 and second suggestion 214 are included based on the presumption that user 20 is highly likely to turn off cooker 600 and/or unlock electronic lock 400 to receive urgent item 40.

In other words, the first screen includes camera image 301 and image 212 of item 40 to allow user 20 to easily check item 40 delivered to user 20. Further, the first screen includes first suggestion 213 and second suggestion 214 as the next action of user 20 determined based on camera image 301 and image 212 of item 40. By seeing the first screen, user 20 can check, all at once, the arrival of delivery person 50 delivering item 40, the content of item 40, and the next action, and can then take an action.

Figure 9:
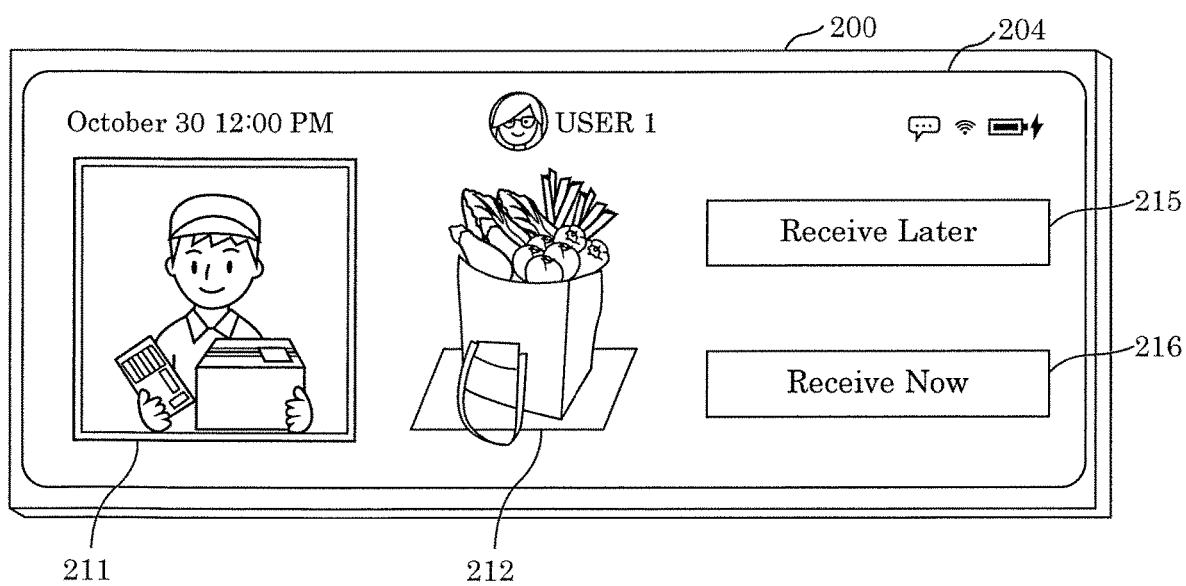
FIG. 9 illustrates an example of a second screen according to Embodiment 1.

FIG. 9 illustrates an example of a second screen according to Embodiment 1. The second screen is displayed when the user state indicates that the user is currently cooking and the urgent information indicates that the delivery is non-urgent.

As illustrated in FIG. 9, display 204 displays, in sequence from the left to the right, camera image 211, image 212 of item 40, first suggestion 215 to request redelivery of item 40, and second suggestion 216 to receive item 40. Here, when an operation to select first suggestion 215 is performed, a third screen, which will be described later, is displayed on display 204, for example. On the other hand, when an operation to select second suggestion 216 is performed, the first screen in FIG. 8 is displayed, for example.

By seeing the second screen, user 20 can check, all at once, the arrival of delivery person 50 delivering item 40, the content of item 40, and the next action, and can then take an action.

Figure 10:
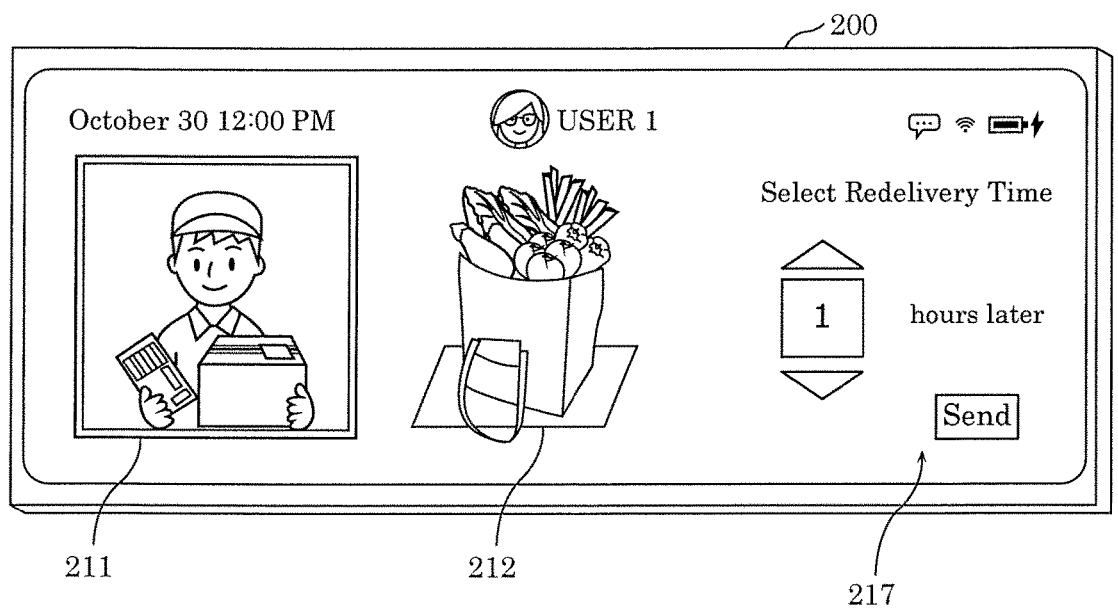
FIG. 10 illustrates an example of a third screen according to Embodiment 1.

FIG. 10 illustrates an example of the third screen according to Embodiment 1. The third screen is displayed after the user has selected the suggestion to request redelivery of item 40.

As illustrated in FIG. 10, display 204 displays, in sequence from the left to the right, camera image 211, image 212 of item 40, and graphical user interface (GUI) 217 via which user 20 can select a redelivery time and transmit a redelivery request to information terminal 500 of delivery person 50. User 20 can select a redelivery time by operating GUI 217. For example, by pressing GUI 217, it is possible to transmit a redelivery request to information terminal 500, requesting delivery person 50 to redeliver item 40 after the selected number of hours. That is to say, a request for redelivery of item 40 is transmitted to information terminal 500 when a selection of the suggestion to request redelivery of item 40 is received.

Figure 11:
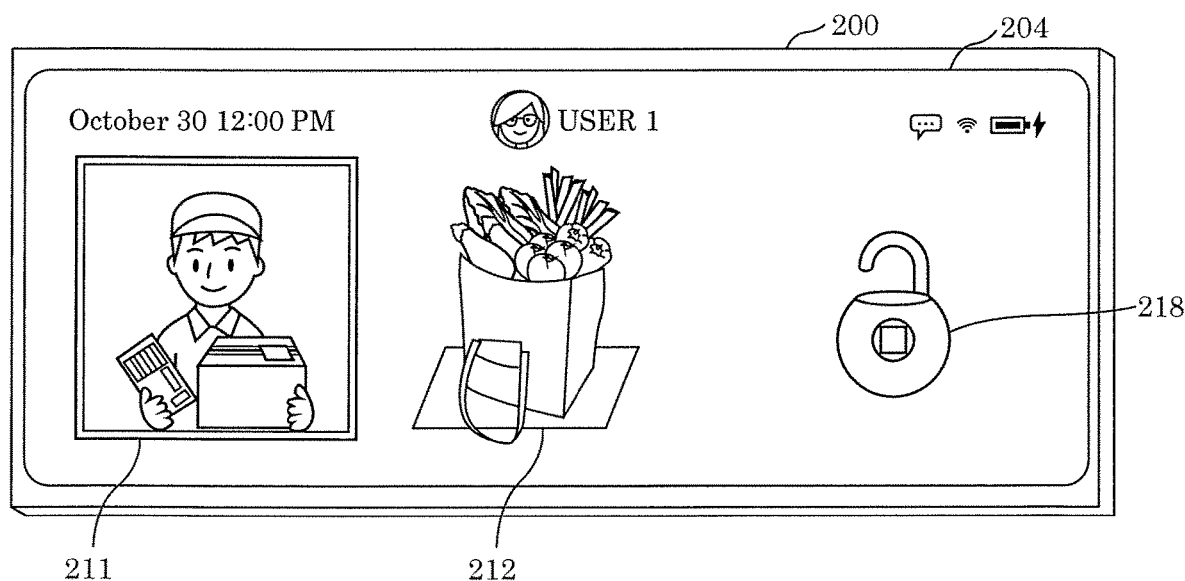
FIG. 11 illustrates an example of a fourth screen according to Embodiment 1.

FIG. 11 illustrates an example of a fourth screen according to Embodiment 1. The fourth screen is displayed when the user state indicates that the user is not cooking and the urgent information indicates that the delivery is urgent.

As illustrated in FIG. 11, display 204 displays, in sequence from the left to the right, camera image 211, image 212 of item 40, and first suggestion 218 to unlock electronic lock 400 on entrance door 30. Here, when an operation to select first suggestion 218 is performed, electronic lock 400 is unlocked.

By seeing the fourth screen, user 20 can check, all at once, the arrival of delivery person 50 delivering item 40, the content of item 40, and the next action, and can then take an action.

Figure 12:
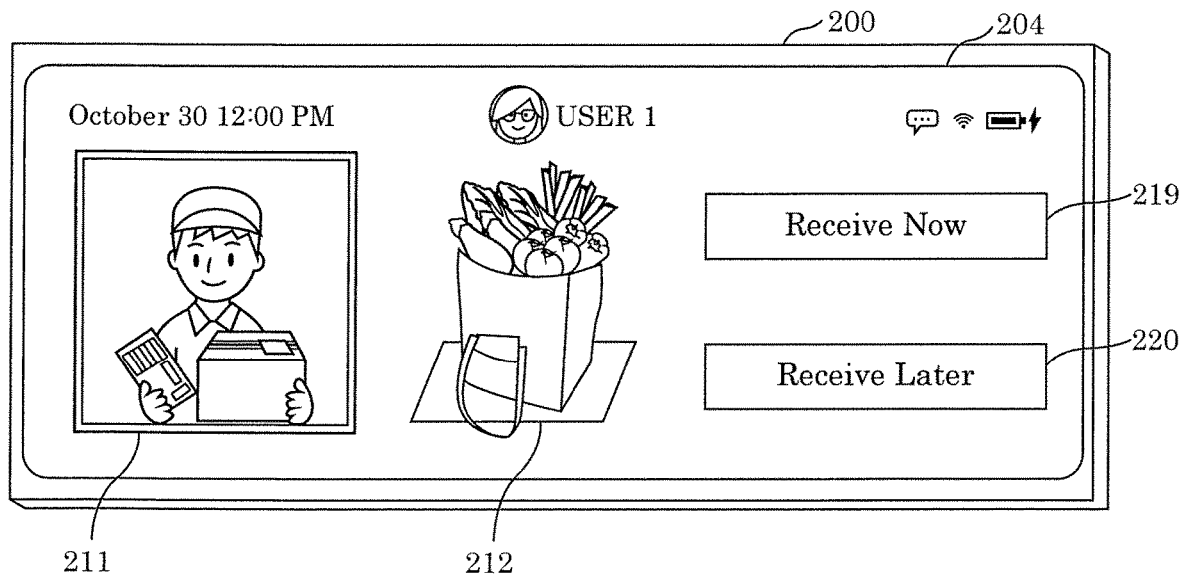
FIG. 12 illustrates an example of a fifth screen according to Embodiment 1.

FIG. 12 illustrates an example of a fifth screen according to Embodiment 1. The fifth screen is displayed when the user state indicates that the user is not cooking and the urgent information indicates that the delivery is non-urgent.

As illustrated in FIG. 12, display 204 displays, in sequence from the left to the right, camera image 211, image 212 of item 40, first suggestion 219 to receive item 40, and second suggestion 220 to request redelivery of item 40. Here, when an operation to select first suggestion 219 is performed, the fourth screen in FIG. 11 is displayed, for example. On the other hand, when an operation to select second suggestion 220 is performed, the third screen in FIG. 10 is displayed, for example.

By seeing the fifth screen, user 20 can check, all at once, the arrival of delivery person 50 delivering item 40, the content of item 40, and the next action, and can then take an action.

[Step S303]

Processor 101 of information processing server 100 performs control based on the suggestion selected. For example, processor 101 transmits an unlock signal to electronic lock 400 on entrance door 30 when display terminal 200 receives a selection of the suggestion to unlock electronic lock 400 (second suggestion 214 in FIG. 8, for example). This way, electronic lock 400 is unlocked. For example, an OFF signal is transmitted to cooker 600 when display terminal 200 receives a selection of the suggestion to turn off cooker 600 (first suggestion 213 in FIG. 8, for example). This way, cooker 600 becomes non-operational. When entrance door 30 is an entrance door in a public space of, for example, an apartment building, an office building, or a commercial building, electronic lock 400 may be unlocked after a lapse of a first period or less, following the reception of the unlock signal. An example of the first period is a period required for communication, or a few seconds. However, when entrance door 30 is an entrance door leading directly to a private space such as a residence, an office, or a shop, delivery person 50 can enter the private space before the user arrives at entrance door 30, and thus, the user may not feel safe using the system. In view of this, as compared to electronic lock 40 on entrance door 30 to a public space, electronic lock 40 on entrance door 30 to a private space may be unlocked after a lapse of a second period which is longer than the first period, following the reception of the unlock signal. An example of the second period is an average period required for the user to come to entrance door 30, or 30 seconds. Alternatively, the second period may be user-settable. For example, in the case of a residence, the second period may be set to a time period corresponding to the distance from the user to the kitchen.

Advantageous Effects, Etc.

As described above, in information processing system 10 according to the present embodiment, information processing server 100 can: (a) obtain, using sensor 700, a user state indicating whether user 20 is currently cooking using cooker 600, when an image of delivery person 50 delivering item 40 to a building in which user 20 is present is captured by camera 300 provided at entrance door 30 of the building; (b) obtain content information of item 40; (c) obtain at least one suggestion associated with the user state and the content information of item 40; and (d) cause display terminal 200 provided in the building to display the image of delivery person 50, the content information of item 40, and the at least one suggestion.

This makes it possible to display, on display terminal 200, at least one suggestion according to the user state and the content information of item 40. That is to say, at least one suggestion appropriate to user 20 and item 40 can be presented to user 20. Moreover, since the content information of item 40 can be displayed in addition to the image of delivery person 50, user 20 can determine the next action based on the content of item 40. Accordingly, when delivery person 50 delivering item 40 arrives, it is possible to effectively present user 20 with information which assists user 20 in determining the next action. In information processing system 10 according to the present embodiment, the content information of item 40 includes urgent information indicating whether delivery of item 40 is urgent, and in (c), when the user state indicates that user 20 is currently cooking and the urgent information indicates that the delivery is urgent, information processing server 100 can obtain, as the at least one suggestion, a suggestion to turn off cooker 600 and a suggestion to unlock electronic lock 400 on entrance door 30 of the building.

With this, when item 40 of an urgent delivery arrives while user 20 is cooking, it is possible to effectively present the user with suggestions of actions necessary for safely receiving item 40. That is to say, it is possible to present user 20 with a suggestion of an action that reduces occurrence of an accident with cooker 600 while inhibiting a postponement of reception of item 40 of the urgent delivery, and it is possible to more effectively present user 20 with information which assists user 20 in determining the next action.

In information processing system 10 according to the present embodiment, in (c), when the user state indicates that user 20 is currently cooking and the urgent information indicates that the delivery is non-urgent, information processing server 100 can obtain, as the at least one suggestion, a suggestion to request redelivery of item 40 and a suggestion to receive item 40.

With this, when item 40 of a non-urgent delivery arrives while user 20 is cooking, it is possible to present a suggestion to request redelivery of item 40 and a suggestion to receive item 40, from which user 20 can select the next action. That is to say, with reference to the content information of item 40, user 20 can determine, for each item 40, whether to request redelivery of item 40 or to receive item 40. In other words, information processing server 100 can more effectively present user 20 with information which assists user 20 in determining the next action.

In information processing system 10 according to the present embodiment, in (c), when the user state indicates that user 20 is not cooking and the urgent information indicates that the delivery is urgent, information processing server 100 can obtain, as the at least one suggestion, a suggestion to unlock electronic lock 400 on entrance door 30 of the building.

With this, when item 40 of an urgent delivery arrives while user 20 is not cooking, it is possible to effectively present the user with a suggestion of an action necessary for receiving item 40. In such a case, user 20 is less likely to select, as the next action, request redelivery of item 40, and thus, it is possible to more effectively present user 20 with information which assists user 20 in determining the next action.

In information processing system 10 according to the present embodiment, in (c), when the user state indicates that user 20 is not cooking and the urgent information indicates that the delivery is urgent, information processing server 100 can obtain, as the at least one suggestion, a suggestion to receive item 40 and a suggestion to request redelivery of item 40.

With this, when item 40 of an urgent delivery arrives while user 20 is not cooking, it is possible to present a suggestion to receive item 40 and a suggestion to request redelivery of item 40, from which user 20 can select the next action. That is to say, with reference to the content information of item 40, user 20 can determine, for each item 40, whether to receive item 40 or to request redelivery of item 40. In other words, information processing server 100 can more effectively present user 20 with information which assists user 20 in determining the next action.

Note that although the content information of item 40 according to the present embodiment includes the urgent information, the content information of item 40 is not limited to this. For example, the content information of item 40 may include the type of item 40. For example, the type of item 40 is fresh food, frozen food, or the like. In such a case, at least one suggestion is obtained based on the user state and the type of item 40.

Note that the content information of item 40 in the present embodiment includes an image of item 40; however, a product name of item 40 may be included instead of an image of item 40. The content information of item 40 may include both an image of item 40 and a product name of item 40.

Note that the screens and data illustrated in the present embodiment are mere examples, and the present disclosure is not limited to these examples. For example, the display regions in which the three pieces of information are displayed need not be identical in size and shape. The combinations of (i) a user state and an urgent flag and (ii) a first suggestion and a second suggestion, illustrated in FIG. 5, are a mere example, and the present disclosure is not limited to this example. First suggestions and second suggestions different from those in FIG. 5 may be associated with user states and urgent flags.

Figure 13:
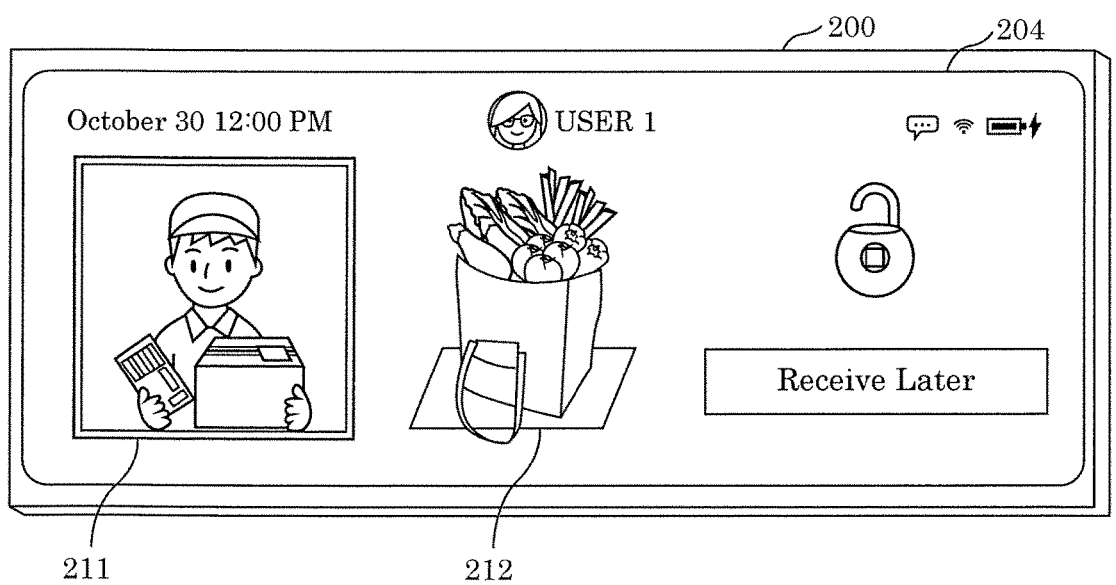
FIG. 13 illustrates an example of another screen according to Embodiment 1.
Figure 14:
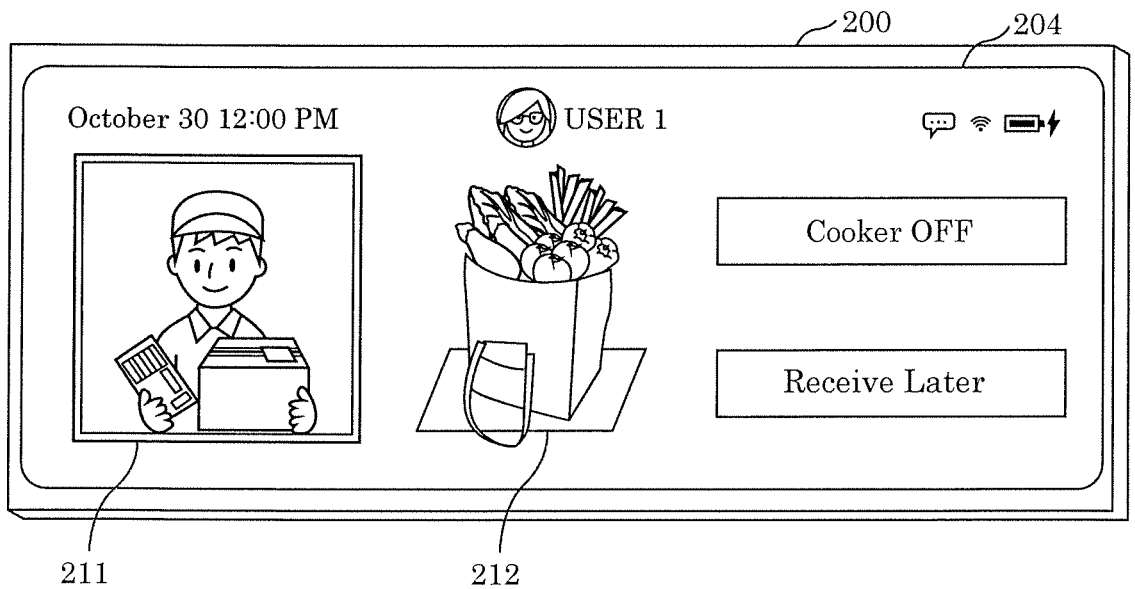
FIG. 14 illustrates an example of another screen according to Embodiment 1.
Figure 15:
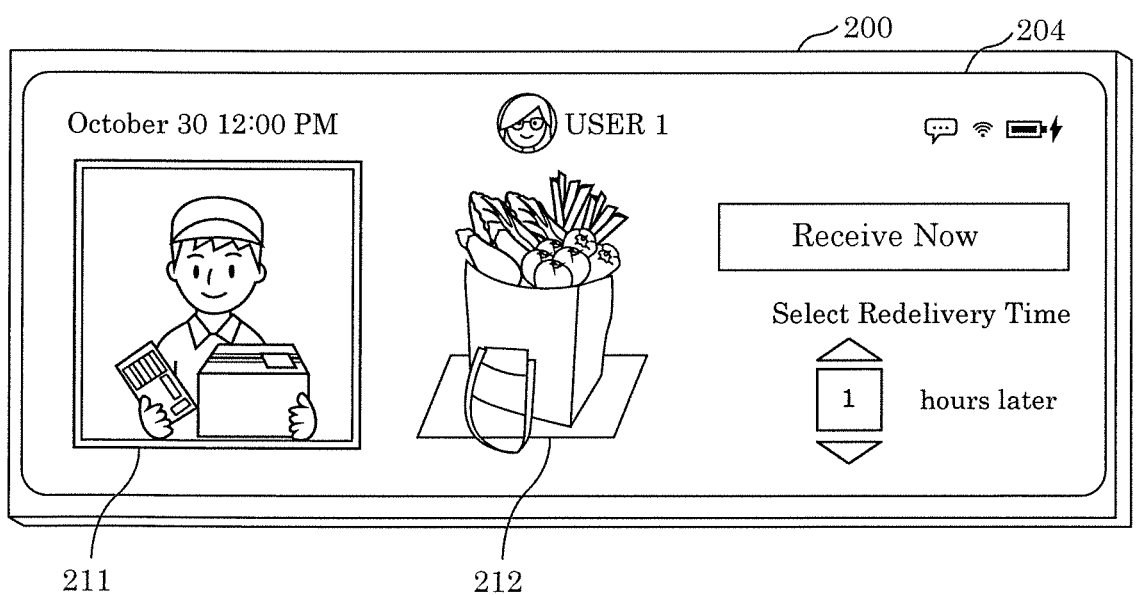
FIG. 15 illustrates an example of another screen according to Embodiment 1.
Figure 16:
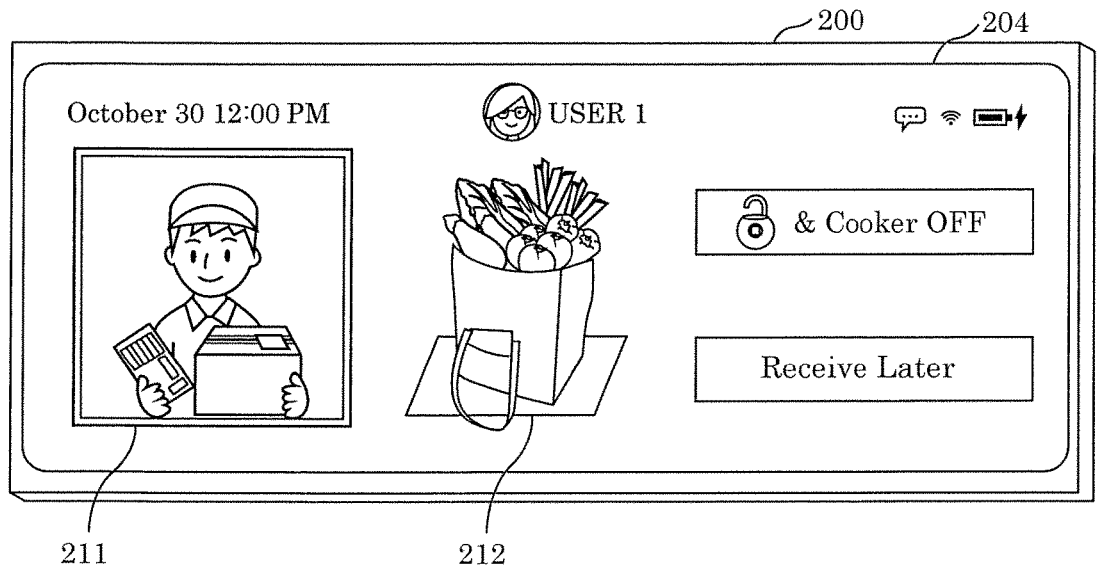
FIG. 16 illustrates an example of another screen according to Embodiment 1.

For example, as illustrated in FIG. 13, Unlock may be used as the first suggestion and Receive Later as the second suggestion. For example, as illustrated in FIG. 14, Cooker OFF may be used as the first suggestion and Receive Later as the second suggestion. For example, as illustrated in FIG. 15, Receive Now may be used as the first suggestion and Select Redelivery Time as the second suggestion. For example, as illustrated in FIG. 16, Unlock & Cooker OFF may be used as the first suggestion and Receive Later as the second suggestion.

Note that the user states and the values of the urgent flag that lead to the screen examples in FIG. 8 to FIG. 16 are not particularly limited, and any user state and any value of the urgent flag may lead to the screen examples in FIG. 8 to FIG. 16.

Note that in the present embodiment, first data 801a, second data 802a, and third data 803a are referred to, however; the present disclosure is not limited to this. For example, first data 801a need not be referred to. In such a case, whether or not the user is currently cooking may be directly determined based on the ON/OFF signal of cooker 600, for example. Further, second data 802a need not be referred to. In such a case, the content information of item 40 may be directly obtained from a camera image, for example. Further, third data 803a need not be referred to. In such a case, third data 803a may be hard coded.

Note that in the present embodiment, the processing order of the flow chart in FIG. 6 is a mere example, and the present disclosure is not limited to this example. For example, Steps S201 and S202 may be performed before Steps S101 and 102.

After the service providing system is used for a certain time period and after Step S303 is finished, a selection screen may be displayed for the user to select the user's preferred display mode for display 200 in Step S302, out of a display mode in which plural pieces of information are sequentially displayed in the display regions and a display mode in which plural pieces of information are simultaneously displayed in the display regions. The display mode for Step S302 which is to be applied next time the service is provided is determined based on the display mode selected by the user.

Note that the user may be given a choice among the first to fifth screens illustrated in FIG. 8 to FIG. 12. For example, the initial setting may be the first screen, and after the processing of the flow chart illustrated in FIG. 6 is finished, display 200 may display, to the user, the first to fifth screens and a message prompting the user to select a screen which the user wishes to be displayed from next time onward. From next time onward, suggestions are displayed to the user based on the screen selected by the user. For example, the first to fifth screens are displayed in a temporal order. Further, when processing is performed a certain number of times on the screen which the user has selected, display 200 may display again the first to fifth screens and a message prompting the user to select a screen which the user wishes to be displayed from next time onward. Examples of the certain number of times include 10, 30, and 50. When the user is repeatedly prompted to select a screen for every certain number of times and the user successively selects the same screen, the user need not be prompted to select a screen after that.

Embodiment 2

Next, Embodiment 2 will be described. The present embodiment describes a service providing system that provides a service including provision of information on a screen to be displayed on a display terminal.

[Overview of Service Provided]

Figure 17A:
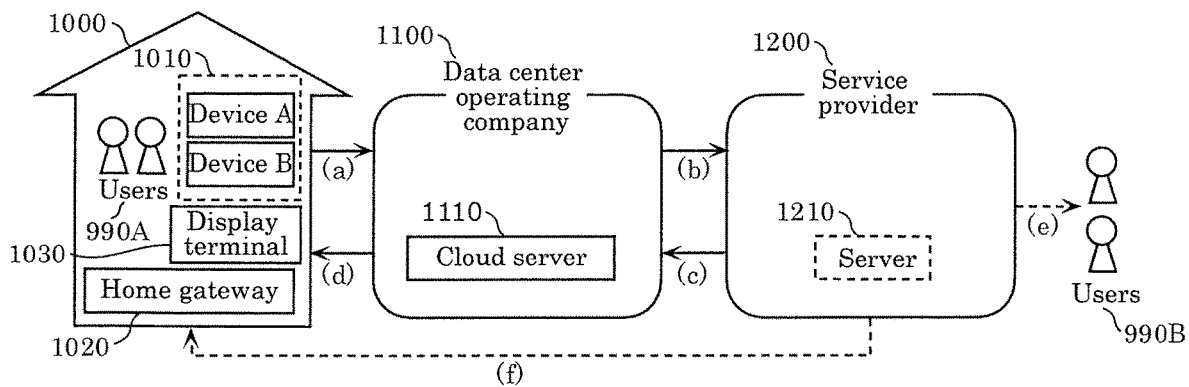
FIG. 17A illustrates an overview of a service providing system according to Embodiment 2.

FIG. 17A illustrates an overview of a service providing system according to Embodiment 2.

Group 1000 may be, for example, a company, an organization, or a household of any size. Group 1000 includes device A and device B that are included in devices 1010, and home gateway 1020. Device A is, for example, cooker 600 according to Embodiment 1. Devices 1010 include devices connectable to the Internet (e.g., a smartphone, PC, and TV) and devices unconnectable to the Internet by themselves (e.g., an illumination and a washing machine). Devices 1010 may include devices that are unconnectable to the Internet by themselves but are connectable to the Internet via home gateway 1020. Moreover, group 1000 includes users 990A of devices 1010.

Figure 17B:
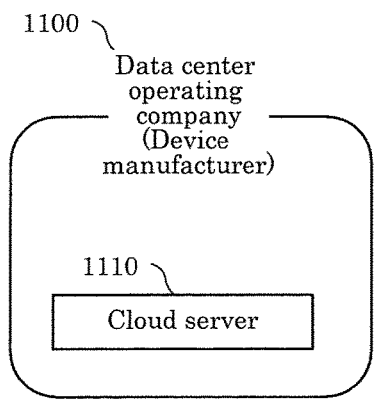
FIG. 17B illustrates an example of a data center operating company according to Embodiment 2.
Figure 17C:
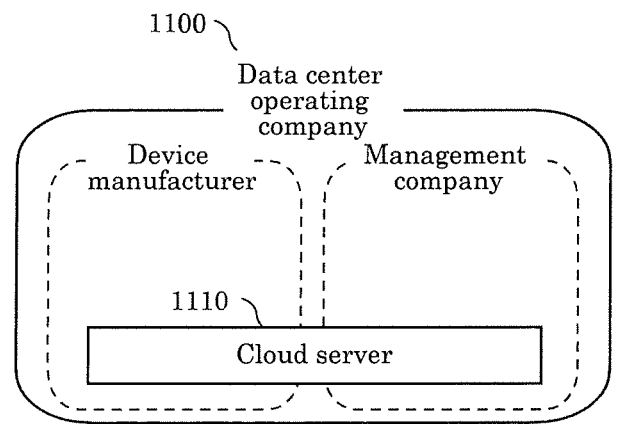
FIG. 17C illustrates an example of a data center operating company according to Embodiment 2.

Data center operating company 1100 includes cloud server 1110. Cloud server 1110 is a virtual server that operates in cooperation with various devices via the Internet. For example, cloud server 1110 is information processing server 100 according to Embodiment 1. Cloud server 1110 mainly manages large data (big data) that is hard to handle with ordinary database management tools or the like. Data center operating company 1100 manages data and cloud server 1110 and, for example, operates a data center for the management. Service provided by data center operating company 1100 will be specifically described later. In this case, data center operating company 1100 is not limited to companies that are only involved in data management and the operation etc. of cloud server 1110. For example, if a device manufacturer that develops and manufactures one of devices 1010 also manages data and cloud server 1110, the device manufacturer is equivalent to data center operating company 1100 (FIG. 17B). Data center operating company 1100 is not limited to a single company. For example, if a device manufacturer and another management company are involved in data management and the operation of cloud server 1110 in a collaborative or shared manner, at least one of the device manufacturer and the management company is equivalent to data center operating company 1100 (FIG. 17C).

Service provider 1200 possesses server 1210. In this configuration, server 1210 includes, for example, memory in a personal PC regardless of the size. The service provider may not possess server 1210.

In this service, home gateway 1020 is not mandatory. For example, if cloud server 1110 totally manages data, home gateway 1020 is not necessary. There are also cases where devices unconnectable to the Internet by themselves are not provided, as in the case where all the home devices are connected to the Internet.

The flow of information in the service will be described below.

First, device A or device B of group 1000 transmits information obtained in each device to cloud server 1110 of data center operating company 1100. Cloud server 1110 accumulates information on device A or device B ((a) of FIG. 17A). The accumulated information indicates, for example, the operating condition, the operation date and time, the operation mode, and the position of each device 1010. For example, the information includes but is not limited to the television viewing history, information on the recording schedule of a recorder, the operating date and time of a washing machine, the amount of laundry, the date and time of opening/closing of a refrigerator, the number of times of opening/closing of a refrigerator, and the amount of foods in a refrigerator. Any kinds of information available from all the devices can be used. Information may be directly provided to cloud server 1110 from devices 1010 via the Internet. Alternatively, information may be temporarily accumulated in home gateway 1020 from devices 1010 and then provided to cloud server 1110 from home gateway 1020.

Next, cloud server 1110 of data center operating company 1100 provides service provider 1200 with the accumulated information in constant units. In this case, the constant units may be units in which the data center operating company can organize and provide the accumulated information to service provider 1200 or units requested by service provider 1200. The units need not be constant units. The amount of information provided may vary depending on the circumstances. Where necessary, the information is stored in server 1210 provided in service provider 1200 ((b) in FIG. 17A). Then, service provider 1200 organizes the information suitably for user service and then provides the information to users. The users whom the information is provided to may be users 990A of devices 1010 or external users 990B. The service may be directly provided to users from the service provider, for example ((e) and (f) of FIG. 17A). The service may be provided to users after passing through, for example, cloud server 1110 of data center operating company 1100 again ((c) and (d) of FIG. 17A). Cloud server 1110 of data center operating company 1100 may organize the information suitably for user service and then provide the information to service provider 1200.

User 990A and user 990B may be different from each other or identical to each other.

Figure 18:
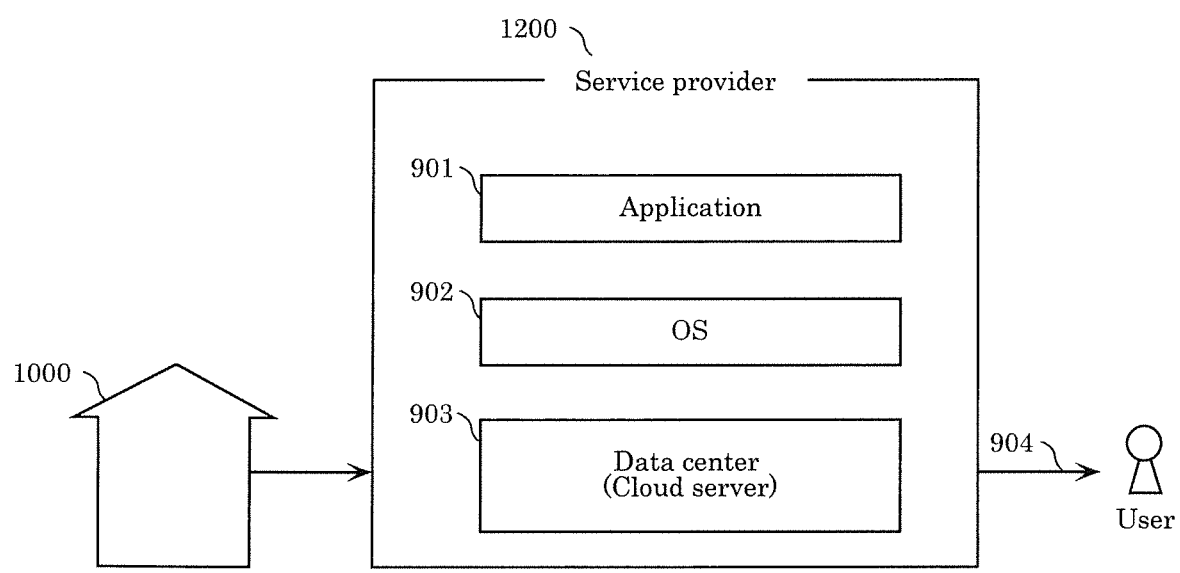
FIG. 18 illustrates service type 1 (company-owned data center) according to Embodiment 2.

Techniques described in the foregoing embodiments can be implemented by, for example, the following types of cloud service. However, types of cloud service for implementing the techniques described in the embodiments are not limited to the following types:

[Service Type 1: Company-Owned Data Center] FIG. 18 illustrates service type 1 (company-owned data center). In this type, service provider 1200 obtains information from group 1000 and provides service to users. In this type, service provider 1200 has the function of the data center operating company. Specifically, the service provider includes cloud server 1110 that manages big data. Thus, data center operating companies are not present.

In this type, service provider 1200 operates and manages data center 903 (cloud server 1110). Moreover, service provider 1200 manages OS 902 and application 901. Service provider 1200 provides service 904 by using OS 902 and application 901 that are managed by service provider 1200.

[Service Type 2: IaaS-Based]

Figure 19:
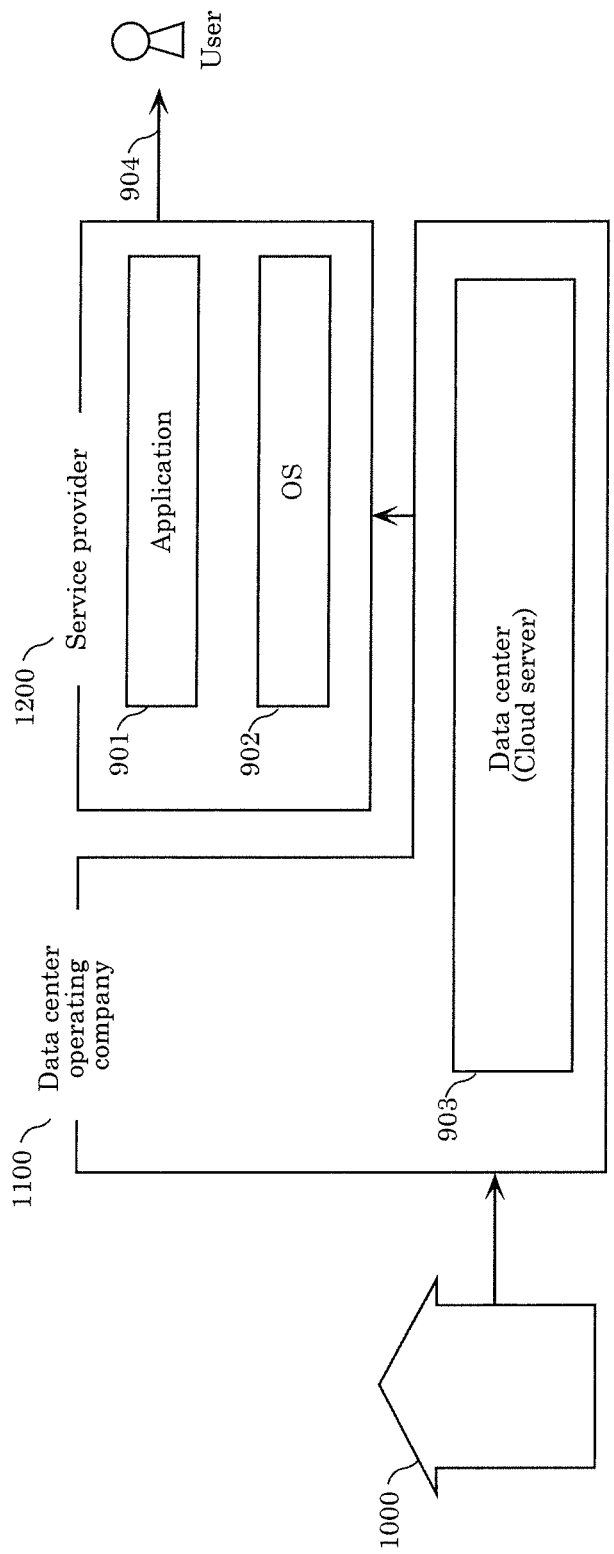
FIG. 19 illustrates service type 2 (IaaS-based) according to Embodiment 2.

FIG. 19 illustrates service type 2 (IaaS-based). IaaS stands for Infrastructure as a Service, which is a cloud service provision model for providing, as service via the Internet, an infrastructure for constructing and operating a computer system.

In this type, data center operating company 1100 operates and manages data center 903 (cloud server 1110). Moreover, service provider 1200 manages OS 902 and application 901. Service provider 1200 provides service 904 by using OS 902 and application 901 that are managed by service provider 1200.

[Service Type 3: PaaS-based]

Figure 20:
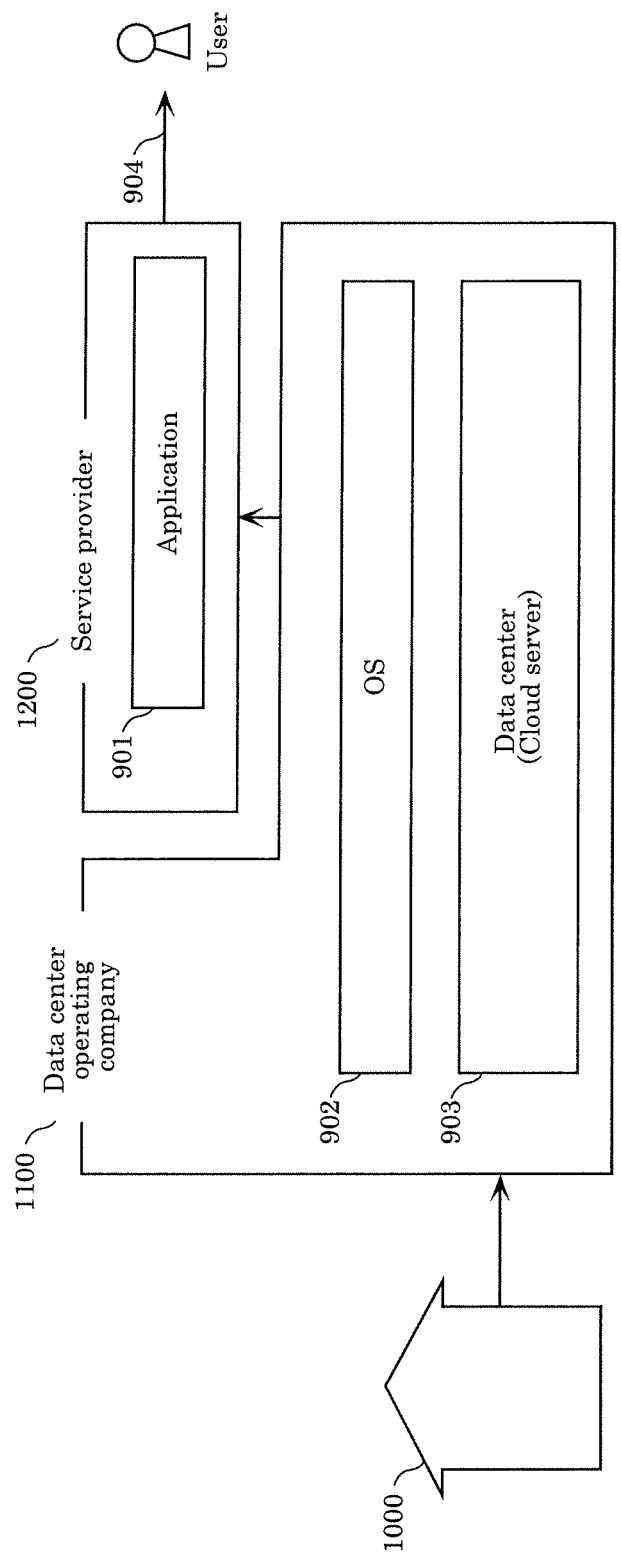
FIG. 20 illustrates service type 3 (PaaS-based) according to Embodiment 2.

FIG. 20 illustrates service type 3 (PaaS-based). PaaS stands for Platform as a Service, which is a cloud service provision model for providing, as service via the Internet, a platform for constructing and operating software.

In this type, data center operating company 1100 manages OS 902 and operates and manages data center 903 (cloud server 1110). Moreover, service provider 1200 manages application 901. Service provider 1200 provides service 904 by using OS 902 managed by the data center operating company and application 901 managed by service provider 1200.

[Service Type 4: SaaS-based]

Figure 21:
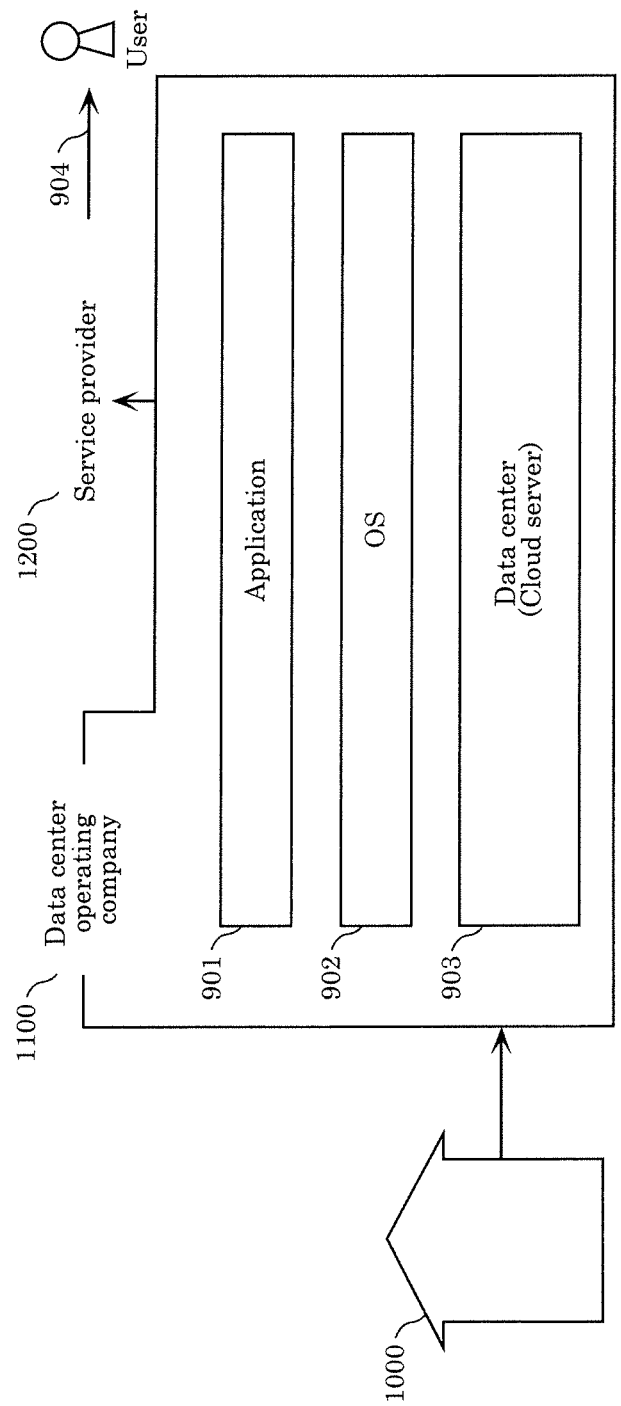
FIG. 21 illustrates service type 4 (SaaS-based) according to Embodiment 2.

FIG. 21 illustrates service type 4 (SaaS-based). SaaS stands for Software as a Service. For example, SaaS is a cloud service provision model that enables a company/individual (user) who does not have a data center (cloud server) to use an application provided by a platform provider having a data server (cloud server) via a network such as the Internet.

In this type, data center operating company 1100 manages application 901, manages OS 902, and operates and manages data center 903 (cloud server 1110). Service provider 1200 provides service 904 by using OS 902 and application 901 that are managed by data center operating company 1100.

In all of the types, service is provided by service provider 1200. For example, the service provider or the data center operating company may develop its own OS, application, or the database of big data etc., or outsource the development to a third party.

Other Embodiments

While the foregoing has described an information processing system according to one or more aspects of the present disclosure based on exemplary embodiments, the present disclosure is not limited to these embodiments. Various modifications to these embodiments conceivable to those skilled in the art, as well as embodiments resulting from combinations of constituent elements in different embodiments may be included within the scope of one or more aspects of the present disclosure, so long as they do not depart from the essence of the present disclosure.

For example, an aspect of the present disclosure may be a display control method which includes, as steps, not only processing performed by such an information processing system, but also processing performed by a processor included in the information processing system. Further, an aspect of the present disclosure may be a computer program which causes a computer to perform each characteristic step included in a display control method. Furthermore, an aspect of the present disclosure may be a non-transitory computer-readable recording medium having such a computer program recorded thereon.

Such a program causes a computer to (a) obtain, using a sensor, a user state indicating whether a user is currently cooking using a cooker, when an image of a delivery person delivering an item to a building in which the user is present is captured by a camera provided at an entrance door of the building; (b) obtain content information of the item; (c) obtain at least one suggestion associated with the user state and the content information of the item; and (d) cause a display terminal provided in the building to display the image of the delivery person, the content information of the item, and the at least one suggestion.

In the present disclosure, part or all of the units and devices, or part or all of the functional blocks in the block diagram illustrated in FIG. 2 may be implemented by one or more electric circuits including a semiconductor device, a semiconductor integrated circuit (IC), or a large scale integration (LSI) circuit. LSI or IC may be integrated in a single chip, or may be configured by combining a plurality of chips. For example, functional blocks other than memory elements may be integrated in a single chip. Although the names used here are LSI and IC, but the integrated circuit may also be called a system LSI circuit, a very LSI circuit (VLSI), or an ultra LSI (ULSI) circuit depending on the degree of integration. A field programmable gate array (FPGA) programed after manufacturing of the LSI circuit or a reconfigurable logic device which is reconfigurable in connection or settings of circuit cells inside the LSI circuit may be used for the same purpose.

Moreover, some or all of the functions or operations of the units, devices, or part of the devices can be performed through software processing. In such a case, software is recorded on a non-transitory recording medium such as one or more ROMs, optical discs, or hard disk drives, and the software, when executed by a processor, causes the processor and a peripheral device to perform particular functions of the software. The system or device may include one or more non-transitory recording media having software recorded thereon, a processor, and a necessary hardware device, such as an interface.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to an information processing system which provides a user with a suggestion of an action to take when a delivery person with a delivery item arrives at a building in which the user is present.

What is claimed is:

1. A display control method performed using a system including an information processing server, the display control method comprising:
   (a) obtaining, by the information processing server, using a sensor, a user state indicating whether a user is currently cooking using a cooker, when an image of a delivery person delivering an item to a building in which the user is present is captured by a camera provided at an entrance door of the building;
   (b) obtaining, by the information processing server, content information of the item;
   (c) obtaining, by the information processing server, at least one suggestion associated with the user state and the content information of the item; and
   (d) causing, by the information processing server, a display terminal provided in the building to display the image of the delivery person, the content information of the item, and the at least one suggestion.

2. The display control method according to claim 1, wherein
   the content information of the item includes urgent information indicating whether delivery of the item is urgent, and
   in (c), when the user state indicates that the user is currently cooking and the urgent information indicates that the delivery is urgent, the information processing server obtains, as the at least one suggestion, a suggestion to turn off the cooker and a suggestion to unlock an electronic lock on the entrance door of the building.

3. The display control method according to claim 2, wherein
   in (c), when the user state indicates that the user is currently cooking and the urgent information indicates that the delivery is non-urgent, the information processing server obtains, as the at least one suggestion, a suggestion to request redelivery of the item and a suggestion to receive the item.

4. The display control method according to claim 2, wherein
   in (c), when the user state indicates that the user is not cooking and the urgent information indicates that the delivery is urgent, the information processing server obtains, as the at least one suggestion, a suggestion to unlock the electronic lock on the entrance door of the building.

5. The display control method according to claim 2, wherein
   in (c), when the user state indicates that the user is not cooking and the urgent information indicates that the delivery is urgent, the information processing server obtains, as the at least one suggestion, a suggestion to receive the item and a suggestion to request redelivery of the item.

6. The display control method according to claim 1, wherein
   the sensor is provided in the building, and
   in (a), the information processing server obtains the user state based on a sensor value obtained by the sensor.

7. The display control method according to claim 6, wherein
   in (a), the information processing server obtains the user state based on the sensor value by referring to first data associating a plurality of sensor values and a plurality of user states.

8. The display control method according to claim 7, wherein
   the first data associates the plurality of sensor values and the plurality of user states for each of a plurality of users, and
   in (a), the information processing server identifies the user based on the sensor value, and obtains the user state based on the user identified and the sensor value by referring to the first data.

9. The display control method according to claim 1, wherein
   the content information of the item includes one of a product name of the item and an image of the item.

10. The display control method according to claim 1, wherein
    the image includes identification information for identifying the content information of the item, and
    in (b), the information processing server obtains the identification information from the image, and obtains the content information of the item based on the identification information by referring to second data associating a plurality of pieces of identification information and pieces of content information of a plurality of items.

11. The display control method according to claim 1, wherein
    in (b), the information processing server obtains the content information of the item based on a date and a time of obtainment of the image, by referring to second data associating scheduled delivery dates and times and pieces of content information of items.

12. The display control method according to claim 2, further comprising:
   (e) transmitting, by the information processing server, an unlock signal to the electronic lock on the entrance door of the building when the display terminal receives a selection of the suggestion to unlock the electronic lock.

13. The display control method according to claim 3, further comprising:
   (f) transmitting, by the information processing server, a request for redelivery of the item to an information terminal usable by the delivery person, when the display terminal receives a selection of the suggestion to request redelivery of the item.

14. The display control method according to claim 2, further comprising:
   (g) transmitting, by the information processing server, a control signal to the cooker to turn off the cooker, when the display terminal receives a selection of the suggestion to turn off the cooker.

15. The display control method according to claim 1, wherein
   in (c), the information processing server obtains the at least one suggestion associated with the user state and the content information of the item by referring to third data associating (i) a plurality of combinations of a user state and content information of an item and (ii) a plurality of suggestion sets each including at least one suggestion.

16. An information processing server, comprising:
   a processor; and
   memory, wherein
   using the memory, the processor:
   (a) obtains, using a sensor, a user state indicating whether a user is currently cooking using a cooker, when an image of a delivery person delivering an item to a building in which the user is present is captured by a camera provided at an entrance door of the building;
   (b) obtains content information of the item;
   (c) obtains at least one suggestion associated with the user state and the content information of the item; and
   (d) causes a display terminal provided in the building to display the image of the delivery person, the content information of the item, and the at least one suggestion.

17. A display terminal in a system, the system including an information processing server and the display terminal, the display terminal comprising:
   a processor; and
   a display, wherein
   the information processing server:
   (a) obtains, using a sensor, a user state indicating whether a user is currently cooking using a cooker, when an image of a delivery person delivering an item to a building in which the user is present is captured by a camera provided at an entrance door of the building;
   (b) obtains content information of the item; and
   (c) obtains at least one suggestion associated with the user state and the content information of the item, and
   the processor of the display terminal:
   (d) obtains the image of the delivery person, the content information of the item, and the at least one suggestion; and
   (e) displays, on the display, the image of the delivery person, the content information of the item, and the at least one suggestion.

* * * * *